(No Model.)

T. JOHNSTON.
CLUTCH MECHANISM.

No. 545,894. Patented Sept. 10, 1895.

Attest:
Edw. S. Duvall, Jr.
Wm. DuVal Brown

Inventor:
Thomas Johnston
By L. S. Bacon
Atty.

UNITED STATES PATENT OFFICE.

THOMAS JOHNSTON, OF NEWBURG, NEW YORK.

CLUTCH MECHANISM.

SPECIFICATION forming part of Letters Patent No. 545,894, dated September 10, 1895.

Application filed January 10, 1895. Serial No. 534,423. (No model.)

*To all whom it may concern:*

Be it known that I, THOMAS JOHNSTON, a citizen of the United States, residing at Newburg, in the county of Orange and State of New York, have invented certain new and useful Improvements in Clutch Mechanism; and I do hereby declare the following to be a full, clear, and exact description of the invention, such as will enable others skilled in the art to which it appertains to make and use the same.

This invention relates to a new and useful improvement in clutch mechanism, adapted more especially for lawn-mowers; and it consists in the construction and arrangement of parts hereinafter described, and definitely pointed out in the claims.

The invention relates more particularly to that class of clutches whereby a loose member is adapted to be moved back and forth by the teeth. Heretofore the construction usually employed comprises an apertured disk or shaft, through which a pin is passed and has a free movement, the pin being of a length greater than the diameter of the shaft or disk and its protruding end engaged by the teeth on a ring or sleeve. This form of clutch is usually satisfactory and is largely used. It has, however, disadvantages, one of which is that the pin often becomes bent or twisted and binds in the opening, preventing its free movement, and, further, the necessity of forming an opening in the shaft or disk greatly weakens that member.

With my form of clutch all of the advantages of the pin-clutch are attained and the objections thereto overcome.

A further object of the invention is to provide a clutch which will contain the fewest possible number of parts, a feature of recognized desirability.

A still further purpose of the invention is the provision of a clutch which will positively act at all points of its rotation and will be simple in construction and inexpensive.

The objects and purpose of the invention are attained by the construction illustrated in the accompanying drawings, wherein like letters of reference designate corresponding parts in the several views, and in which—

Figure 1:
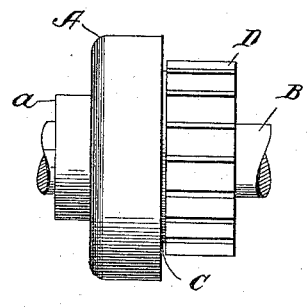
Figure 3:
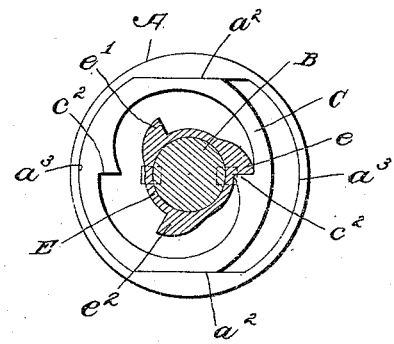
Figure 2:
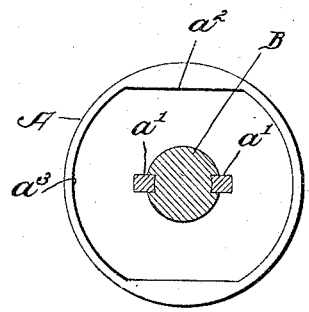
Figure 4:
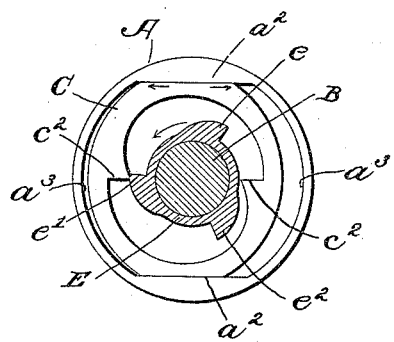
Figure 5:
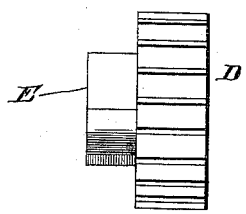
Figure 6:
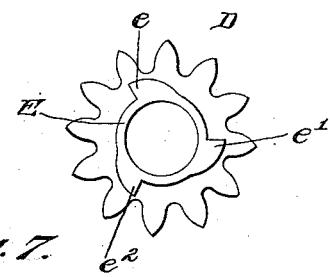
Figure 7:
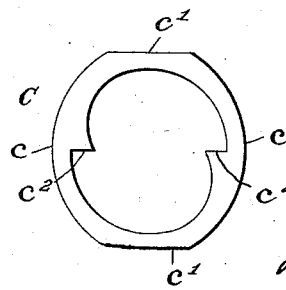

Figure 1 represents a side elevation of the clutch. Fig. 2 is a face view of the cup, showing the shaft in section. Fig. 3 is an elevation of the clutch with the pinion omitted. Fig. 4 is a similar view showing the parts moved to a point opposite that shown in Fig. 3. Fig. 5 is a side elevation of the pinion and cam. Fig. 6 is an elevation thereof, and Fig. 7 is a detail view of the clutching-yoke.

In the drawings, A designates the revoluble cup, forming a housing for the clutch mechanism, having the collar $a$ and the key-slots $a'$ in its rear wall and collar.

B designates the shaft on which the cutting reel is placed, the same being keyed to the cup. The interior or cavity of the cup is formed oblong and has the straight parallel side wall $a^2$ and the curved end walls $a^3$, the rear wall being even or flat. Within the cup is the single-piece rigid yoke C, oblong in shape, its inner and outer faces being flat or even, so as to move easily on the retaining side wall of the cup and pinion hereinafter described. The ends $c$ of the yoke are curved to correspond with the curvature of the walls $a^3$, and the sides $c'$ are straight and parallel to correspond with the straight walls $a^2$ of the cup, against which they work. These sides $c'$ are of a length less than the side walls $a^2$, thereby reducing the comparative length of the yoke for the purpose of allowing the yoke a limited endwise movement in the cup. The inner walls or edges of the yoke are preferably curved to form a substantially oblong space within and have thereon the diametrically-oppositely-arranged teeth $c^2$, formed with abrupt shoulders at one side and gradually inclined on an inward curve on their opposite sides.

D designates the pinion, loosely sleeved on the shaft B, adapted for engagement with the driving mechanism of the machine. On the inner face of the pinion, formed, preferably, integral therewith, is the cam E, having the three teeth $e\ e'\ e^2$, arranged equidistant apart and formed with outwardly-curved tapering rear edges conforming to the curvature of the sides of the teeth $c^2$ and abrupt shoulders. The distance between the ends of the teeth and the point diametrically opposite is substantially the same as the distance between the teeth $c^2$ on the yoke, with a slight clearance, so that as the point of the cam-tooth $e$ reaches the point of one of the teeth $c^2$ the yoke will be shifted by the cam-tooth $e'$, and so on, the reverse movement being had as the cam-tooth $e'$ leaves the tooth $c^2$. The shifting cam-teeth engage the tapered curved portions of the teeth $c^2$, thereby gradually moving the yoke. The cup and the shaft are thereby unaffected by the movement of the pinion and cam in the direction above referred to, the effect usually being had when the mower is being drawn back. When the mower is forced forward to turn the pinion in the opposite direction, the teeth on the cam will engage with their shoulders the opposing shoulders on the teeth of the yoke. By the employment of three teeth the shifting of the yoke will be rapid and in each instance force the opposite tooth thereof into the path of one of the teeth of the cam, so that the clutch is quickly and positively made and the cutting-reel driven with but slight lost motion. It will be observed that the shifting of the yoke is at all times positive as distinguished from a gravity or spring-pressed pawl or yoke.

In operation, as the machine is forced forward the clutch is set, forcing the straight side of the yoke against the side walls of the cup, and thereby rotating the cup which in turn drives the shaft and reel. It will be observed that the yoke is an integral frame, and I thereby avoid the use of joints or rivets, as has been suggested in constructions wherein oppositely arranged dogs are employed. The flat faces of the yoke engage the flat inner faces of the cup and pinion and move freely thereon and the yoke is held in place by the same. The cup therefore forms a housing for the movable yoke and cam, the open face of which is closed by the adjacent face of the pinion. This feature is important, as grass and other foreign substance are precluded from entering the cup and interfering with the perfect movement of the parts.

I am aware that minor changes in the construction and arrangement of the parts of the device can be made and substituted for those herein shown and described without in the least departing from the nature and principle of my invention.

Having thus described my invention, what I claim as new, and desire to secure by Letters Patent, is—

1. In a clutch mechanism, the combination with a rotary shaft, of a cup keyed on the same, forming a housing for the clutch mechanism and formed with an oblong cavity, a rigid oblong yoke of a length less than the length of the cavity and seated therein, having an open center, and diametrically opposite inwardly extending teeth, a cam having a plurality of teeth, located in the yoke and loosely mounted on the shaft, the distance between the teeth of the cam and the points directly opposite being substantially the distance between the teeth of the yoke, whereby the yoke is positively shifted in opposite directions as the teeth of the cam leave the teeth of the yoke, and means for driving the cam, substantially as described.

2. In a clutch mechanism, the combination with a rotary shaft, of a cup rigid thereon constituting a housing for the clutch mechanism having an oblong cavity therein formed with straight sides and curved end walls, a yoke in the cavity formed in a single rigid piece and having straight outer sides engaging and of a length less than the length of the side walls of the cavity and having diametrically opposite teeth on its inner edge, a cam loosely mounted on the shaft and located in the yoke between the sides and having a plurality of teeth adapted to successively engage the opposite teeth of the yoke, and a pinion on which the cam is secured and to which the driving power is applied, substantially as described.

3. In a clutch mechanism for lawn mowers, the combination with a rotary shaft, of a cup keyed thereon having an oblong cavity therein, an oblong single-piece yoke in the cavity of a length less than the length of the cavity and having its outer side walls engaging the side walls of the cavity, teeth on the inner wall of the yoke arranged diametrically opposite each other and formed with tapering curved inner edges and abrupt shoulders, a cam loosely mounted on the shaft having a plurality of teeth arranged to successively engage the yoke teeth and formed with curved tapering edges and abrupt shoulders, and a pinion for driving the cam, substantially as described.

In testimony whereof I affix my signature in presence of two witnesses.

THOMAS JOHNSTON.

Witnesses:
GEORGE KNOWLDEN,
MICHAEL T. CONNOLLY.